(12) United States Patent
Iwasaki

(10) Patent No.: US 7,984,234 B2
(45) Date of Patent: Jul. 19, 2011

(54) MEMORY CONTROL APPARATUS AND MEMORY CONTROL METHOD

(75) Inventor: Shinichi Iwasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 12/196,739

(22) Filed: Aug. 22, 2008

(65) Prior Publication Data
US 2008/0313386 A1 Dec. 18, 2008

Related U.S. Application Data

(63) Continuation of application No. PCT/JP2006/303497, filed on Feb. 24, 2006.

(51) Int. Cl.
*G06F 12/00* (2006.01)
(52) U.S. Cl. ........ 711/105; 711/154; 711/158; 711/170; 710/310; 370/392
(58) Field of Classification Search .................. 711/105, 711/154, 158, 170; 710/310; 370/392
See application file for complete search history.

(56) References Cited

U.S. PATENT DOCUMENTS

| | | | | |
|---|---|---|---|---|
| 4,972,315 A | * | 11/1990 | Yamasaki et al. | 712/201 |
| 5,926,458 A | * | 7/1999 | Yin | 370/230 |
| 5,974,571 A | | 10/1999 | Riesenman et al. | |
| 6,356,972 B1 | * | 3/2002 | Chin et al. | 710/310 |
| 6,820,194 B1 | * | 11/2004 | Bidichandani et al. | 712/245 |
| 6,973,083 B1 | * | 12/2005 | Tachibana | 370/392 |
| 7,069,373 B2 | * | 6/2006 | Teng | 710/310 |

FOREIGN PATENT DOCUMENTS

| | | |
|---|---|---|
| JP | 6-52000 | 2/1994 |
| JP | 9-114727 | 5/1997 |
| JP | 1 069 512 | 1/2001 |
| JP | 2001-84215 | 3/2001 |
| JP | 2006-163711 | 6/2006 |
| WO | 02/21285 A2 | 3/2002 |

OTHER PUBLICATIONS

International Search Report for PCT Application No. PCT/JP2006/303497 (mailed Aug. 1, 2006).
European Search Report dated October 21, 2010 in corresponding European Patent Application 06714636.5.

* cited by examiner

*Primary Examiner* — Stephen C Elmore
(74) *Attorney, Agent, or Firm* — Staas & Halsey LLP

(57) ABSTRACT

A memory control apparatus and a memory control method are provided to enable an effective utilization of buffer memory in a system LSI by comprising buffer memory for temporarily storing data stored in memory, and comprising the processes of: receiving an instruction to the memory; transmitting a buffer memory security-dedicated use packet for securing the capacity of memory in the buffer memory required by the instruction on the basis of the received instruction; receiving a buffer memory validation signal corresponding to the transmitted buffer memory security-dedicated use packet; and executing the received instruction on the basis of the received buffer memory validation signal.

4 Claims, 6 Drawing Sheets

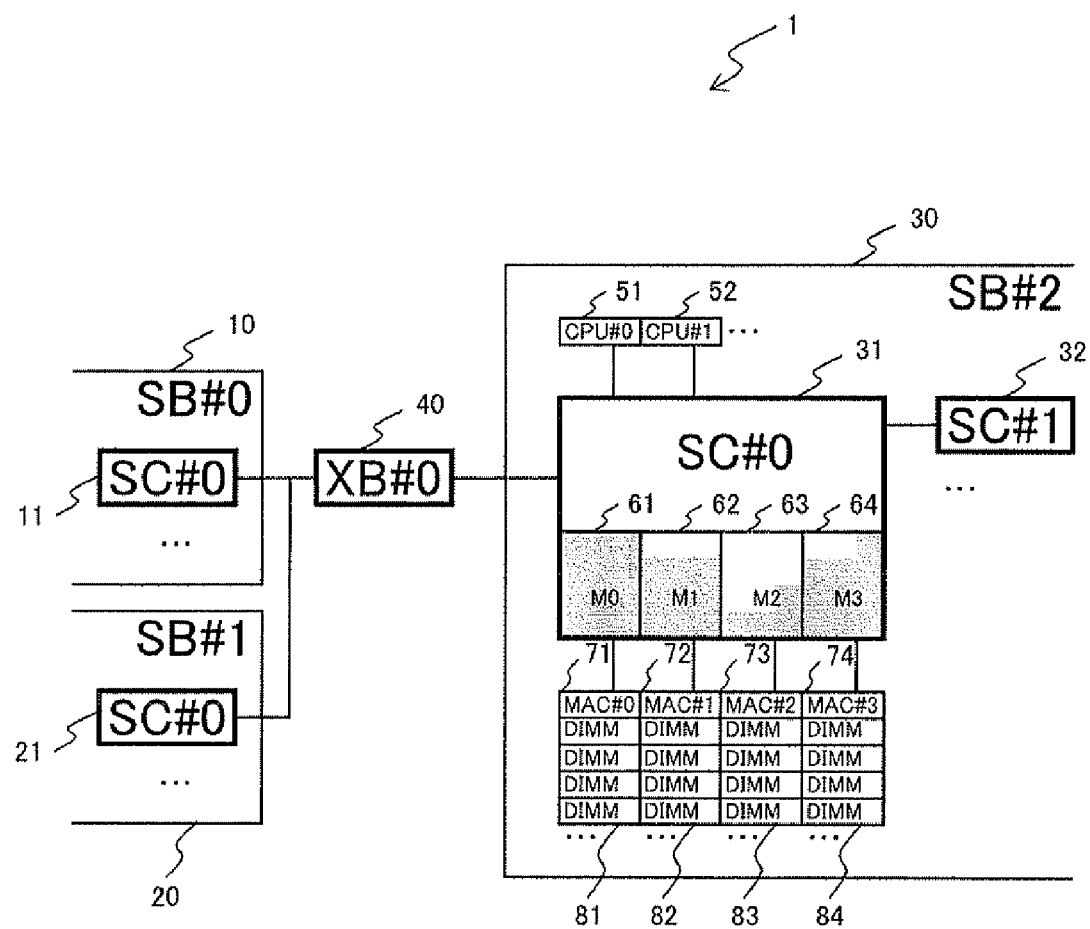
F I G. 1

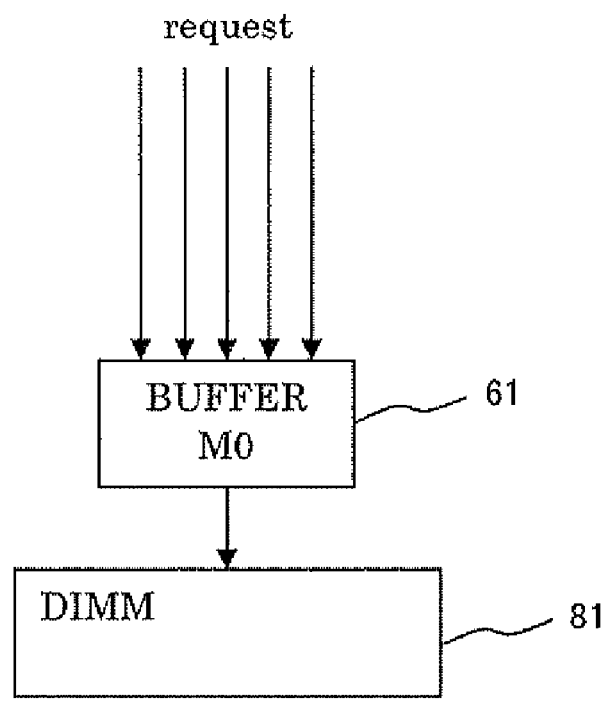
F I G. 2

| 31 | 28 | 27 | 24 | 23 | 20 | 19 | 16 | 15 | 12 | 11 | 8 | 7 | 4 | 3 | 0 |
|---|---|---|---|---|---|---|---|---|---|---|---|---|---|---|---|
| — | OPC [6:0] | | | | | | CTL [2:0] | TARGET [3:0] | | RSVID [11:0] | | | | | |

FIG. 6

MEMORY CONTROL APPARATUS AND MEMORY CONTROL METHOD

CROSS REFERENCE TO RELATED APPLICATION

This application is a continuation application of International PCT Application No. PCT/JP2006/303497 which was filed on Feb. 24, 2006.

BACKGROUND OF THE INVENTION

1. Field of the Invention

The present invention relates to a technique for transferring data between processing units attaining one function or a plurality thereof and in particular to a memory control apparatus and a memory control method utilizing buffer memory effectively in a system LSI comprising a large number of processing units.

2. Description of the Related Art

A conventional system LSI has a configuration of incorporating, on a single chip, plural pieces of functional blocks, which are configured to achieve one function or a plurality thereof. These functional blocks can be regarded as a single processing unit such as a central processing unit (CPU), memory and a dedicated circuit, and a process progresses in the system LSI by exchanging signals or data between the processing units.

As the scale of such a system LSI grows, a problem emerges in exchanging signals between functional blocks, that is, the processing units.

FIG. 1 is a diagram showing the configuration of a system LSI.

Referring to FIG. 1, in the system LSI performing data processing, plural system boards 10 (SB#0), 20 (SB#1) and 30 (SB#2) are interconnected by way of a crossbar switch 40 (XB#0). The system board 30 (SB#2) comprises plural system controllers 31 (SC#0) and 32 (SC#1). Likewise the system board 10 (SB#0) comprises a plurality of system controllers 11 (SC#0) and the like, while the system board 20 (SB#1) comprises a plurality of system controllers 21 (SC#0) and the like.

The system controller 31 (SC#0) controls a read from, and a write to, memory (DIMM) 81, 82, 83 or 84 by way of MAC 71 (MAC#00), 72 (MAC#1), 73 (MAC#3) or 74 (MAC#4) in accordance with an instruction from a CPU (not shown in a drawing herein) connected to either of plural CPUs 51 (CPU#0), 52 (CPU#1), and so on, or either of plural system controllers 32 (SC#1), 11 (SC#0), 21 (SC#0), and so on. Further, when reading from, and writing to, the memory (DIMM) 81, 82, 83 or 84, which is controlled by the system controller 31 (SC#0), buffer memory 61 (M0), 62 (M1), 63 (M2) or 64 (M3), which temporarily stores data corresponding to the memory (DIMM) 81, 82, 83 or 84, is utilized.

As the system LSI becomes very large, however, a large number of instructions and/or many pieces of data (i.e., data packets) sometimes converge into the same buffer memory 61 (M0) 62 (M1), 63 (M2) or 64 (M3).

FIG. 2 is a diagram for describing a phenomenon in which many instructions converge into the same buffer memory.

If a plurality of instructions (i.e., requests) from either CPU require data stored in the memory (DIMM) 81, many instructions are converged into the buffer memory 61 (M0), causing it to overflow with instructions, as shown in FIG. 2.

In order to improve such a situation, the capacity of all the buffer memories 62 (M1), 63 (M2) and 64 (M3), not only the buffer memory 61 (M0), must be increased, and there is a resultant cost increase that makes the method impractical, and therefore the present memory 61 (M0) needs to be used more effectively.

There is accordingly a technique (i.e., BUSY control technique) for issuing a BUSY signal inhibiting the transmission of an instruction or the like from a buffer memory 61 (M0) or the like when the buffer memory 61 (M0) or the like no longer has room to receive an instruction and/or data, that is, when the buffer memory 61 (M0) or the like becomes full or nearly full. The BUSY control technique makes it possible to reduce the possibility of the buffer memory 61 (M0) overflowing with instructions and the like.

Another method is to provide each of the CPUs 51 (CPU#0), 52 (CPU#1) and the like, which hand instructions to a single system controller 31 (SC#0), with plural pieces of buffer memory, thereby making it possible to reduce the possibility of causing the buffer memory 61 (M0) to overflow with instructions and the like.

However, although the above described BUSY control technique does not generate a big practical problem when a system LSI is relatively small, the distances between various LSIs, such as the distance between the system boards 10 (SB#0) and 30 (SB#2) and the distance between the system controllers 11 (SC#0) and 32 (SC#1), become longer as the system LSI becomes larger, thus elongating the transmission time between them. As a result, a "slippage" is generated between the instruction and the BUSY signal, causing a problem in which an instruction is issued to a buffer memory 61 (M0) or the like that is actually unable to receive the instruction.

FIG. 3 is a diagram for describing a phenomenon called "slippage" generated between the instruction and a BUSY signal.

Referring to FIG. 3, first, a first instruction issued from the CPU (CPU#0) of the system board 10 (SB#0) in step (1) (shown in the drawing; the numbers in parentheses, through (14), mean the same hereinafter), is handed over to the system controller 31 (SC#0) of the system board 30 (SB#2) by way of the crossbar switch 40 (XB#0) in step (3), under the control of the system controller 11 (SC#0) (in step (2)). This prompts the system controller 31 (SC#0) to access the memory (DIMM) 81 by way of the MAC 71 (MAC#0) (in step (4)).

If the buffer memory 61 (M0) becomes full at this time, one of the BUSY signals inhibiting the transmission of an instruction or the like from the buffer memory 61 (M0) (in step (5)) is handed over to the system controller 11 (SC#0) of the system board 10 (SB#0) by way of the crossbar switch 40 (XB#0) (in step (6)) under the control of the system controller 31 (SC#0) of the system board 30 (SB#2). Then, the BUSY signal is returned to the CPU (CPU#0) of the system board 10 (SB#0), which initially issued the first instruction, under the control of the system controller 11 (SC#0) (in step (7)).

If, however, a second instruction is issued from the CPU (CPU#0) of the system board 10 (SB#0) and if the second instruction is handed over to the system controller 31 (SC#Q) of the system board 30 (SB#2) by way of the crossbar switch 40 (XB#0) (in step (10)) under the control of the system controller 11 (SC#0) (i.e., step (9)), between the transmission of the first instruction (in step (1)) and the receiving of the BUSY signal (in step (7)), then the buffer memory 61 (M0) is already full and the system controller 31 (SC#0) is unable to receive the second instruction. This state is defined as "slippage".

Note that, even if such a "slippage" occurs, the system controller 31 (SC#0) of the system board 30 (SB#2) returns a response corresponding to the first instruction from the memory (DIMM) 81 by way of the MAC 71 (MAC#0) (in step (11)) and the response is handed over to the system controller 11 (SC#0) of the system board 10 (SB#0) by way of the crossbar switch 40 (XB#0) (in step (13)) under the control of the system controller 31 (SC#0) of the system board 30 (SC#2) (i.e., step (12)). Then, under the control of the system controller 11 (SC#0), the response to the first instruction is returned to the CPU (CPU#0) of the system board 10 (SB#0), which issued the first instruction (in step (14)).

Further, if a configuration is such as to generate a BUSY signal with sufficient time so as to avoid the occurrence of "slippage", that is, if the configuration is such as to issue a BUSY signal inhibiting the transmission of an instruction or the like from a buffer memory 61 (M0) and the like at the timing when the buffer memory 61 (M0) or the like becomes close to full instead of completely full, a problem is generated in which the capacity of the buffer memory 61 (M0) or the like is partially wasted.

Further, if a configuration is such as to provide all the CPUs with corresponding pieces of buffer memory, the required number of pieces of buffer memory increases with the size of a system LSI, thus giving rise to the problem of cost increase.

FIG. 4 is a diagram for describing the problem in the case of comprising pieces of buffer memory corresponding to all CPUs.

For example, if a single system board comprises four system controllers, with each system controller respectively comprising four CPUs, the number of pieces of buffer memory comprised by each system controller increases from four pieces corresponding to the conventional number of CPUs to sixteen pieces corresponding to sixteen CPUs, that is, between the zeroth and fifteenth. That is, the number of required pieces of buffer memory quadruples from four to sixteen.

SUMMARY OF THE INVENTION

In consideration of the situation described above, the present invention aims at providing a memory control apparatus and a memory control method that enable an effective utilization of buffer memory in a system LSI.

The present invention is contrived to adopt a configuration as follows in order to solve the above described problem.

That is, according to one aspect of the present invention, a memory control apparatus of the present invention used for controlling access to memory comprises: buffer memory for temporarily storing data stored in the memory; an instruction reception unit for receiving an instruction to the memory; a buffer memory security-dedicated use packet transmission unit for transmitting a buffer memory security-dedicated use packet for securing the capacity of memory in the buffer memory that is required by an instruction on the basis of the instruction received by the instruction reception unit; a buffer memory validation signal reception unit for receiving a buffer memory validation signal corresponding to a buffer memory security-dedicated use packet transmitted by the buffer memory security-dedicated use packet transmission unit; and an instruction execution unit for executing an instruction received by the instruction reception unit on the basis of a buffer memory validation signal received by the buffer memory validation signal reception unit.

Further, the memory control apparatus according to the present invention is desirably configured such that the instruction is generated by a central processing unit (CPU), and the memory control apparatus is a system controller.

Further, the memory control apparatus according to the present invention is desirably a large-scale integration (LSI) for use in a system LSI comprising a plurality of memory control apparatuses.

Further, according to one aspect of the present invention, a memory control method of the present invention is a method that is used for controlling an access to memory and carried out in a memory control apparatus comprising buffer memory for temporarily storing data stored in the memory, comprising: receiving an instruction to the memory; transmitting a buffer memory security-dedicated use packet for securing the capacity of memory in the buffer memory that is required by the instruction on the basis of the received instruction; receiving a buffer memory validation signal corresponding to the transmitted buffer memory security-dedicated use packet; and executing the received instruction on the basis of the received buffer memory validation signal.

BRIEF DESCRIPTION OF THE DRAWINGS

FIG. 1 is a diagram showing the configuration of a system LSI;

FIG. 2 is a diagram for describing a phenomenon of many instructions converging into the same buffer memory;

FIG. 6 is a diagram showing an example of a buffer memory security-dedicated use packet.

DESCRIPTION OF THE PREFERRED EMBODIMENTS

The following is a description of the preferred embodiment of the present invention by referring to the accompanying drawings.

First is an outline of the present invention.

That is, the present invention is contrived to pre-transmit a buffer memory security-dedicated use packet and pre-secure a storage zone of buffer memory and then carry out an actual accessing.

This configuration makes it possible to perform a memory control while reducing the occurrence of "slippage" drastically without increasing the quantity of buffer memory.

Figure 3:
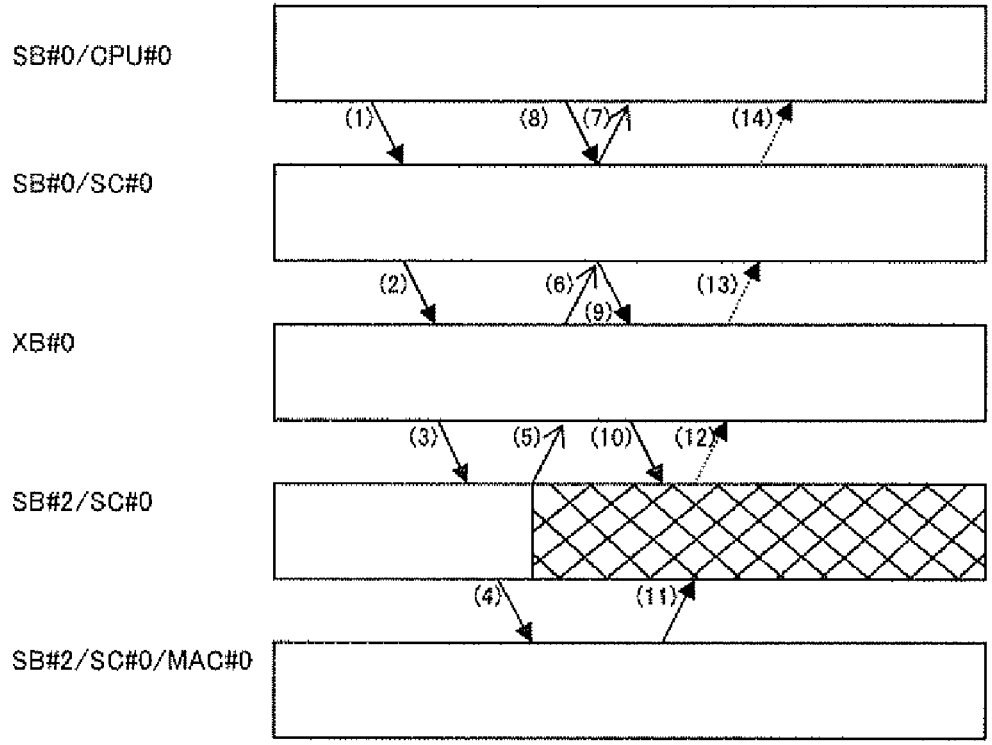
FIG. 3 is a diagram for describing a phenomenon called "slippage" generated between the instruction and a BUSY signal.
Figure 4:
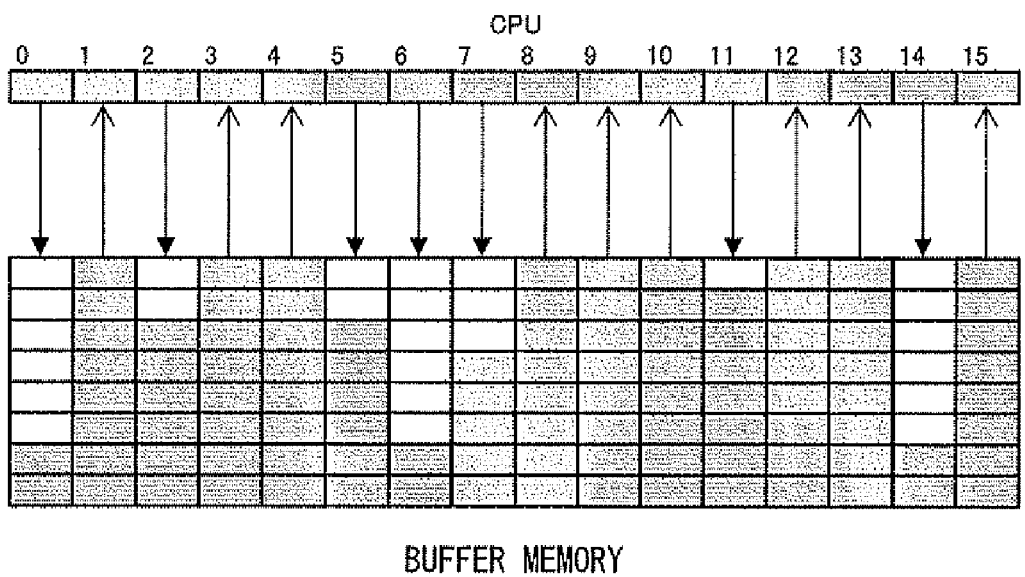
FIG. 4 is a diagram for describing the problem in the case of comprising pieces of buffer memory corresponding to all CPUs.
Figure 5:
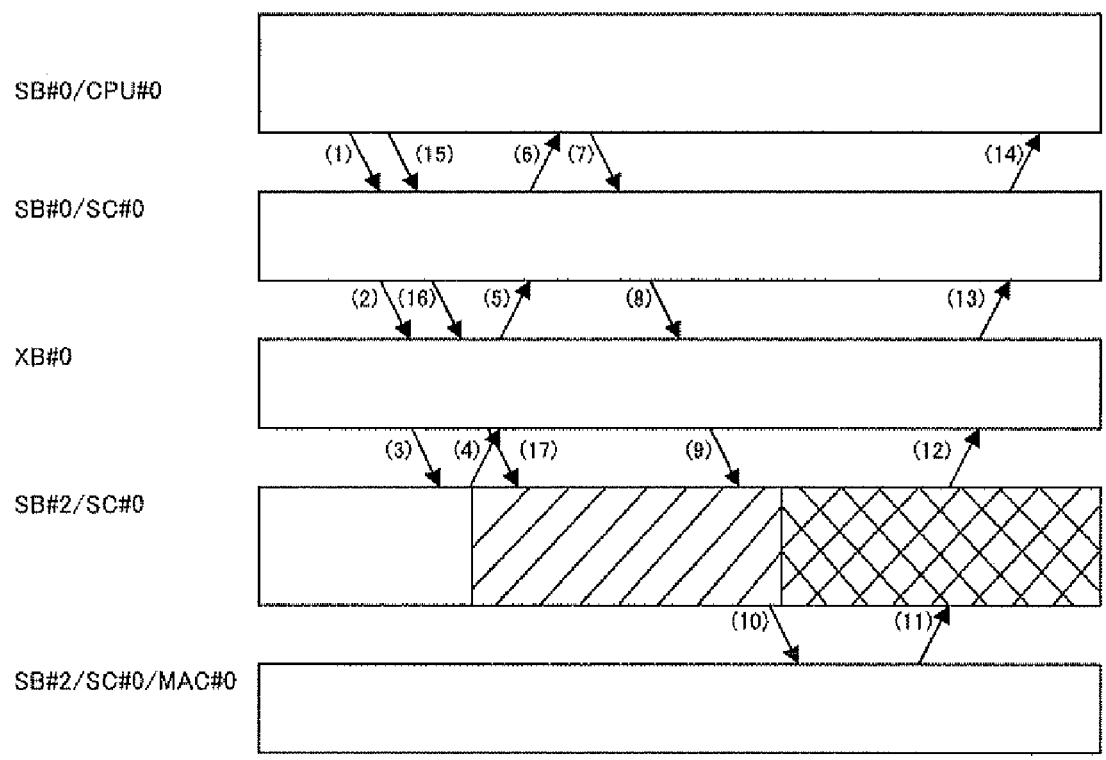
FIG. 5 is a diagram for describing the flow of a memory control to which the present invention is applied.

FIG. 5 is a diagram for describing the flow of a memory control to which the present invention is applied.

Referring to FIG. 5, first, the CPU (CPU#0) of a system board 10 (SB#0) issues a first buffer memory security-dedicated use packet corresponding to the first instruction (in step (1)).

FIG. 6 is a diagram showing an example of a buffer memory security-dedicated use packet.

Referring to FIG. 6, the buffer memory security-dedicated use packet is made of 32 bits (0 through 31), in which the zeroth through eleventh-bit fields store a reserve ID (RSVID); the twelfth through fifteenth-bit fields store the system board number (TARGET) of the addressee, that is, a target; of the sixteenth through eighteenth-bit fields, the sixteenth-bit field stores BANK-ID and the seventeenth to eighteenth-bit fields store MAC-ID; and the twenty-fourth through thirtieth-bit fields store an operation code (OPC).

Returning the description to FIG. 5, the first buffer memory security-dedicated use packet issued from the CPU (CPU#0) of a system board 10 (SB#0) is handed to the system controller 31 (SC#0) of a system board 30 (SB#2) by way of a crossbar switch 40 (XB#0) (in step (3)) under the control of the system controller 11 (SC#0) (step (2)).

This prompts a system controller 31 (SC#0), having received the first buffer memory security-dedicated use packet, to secure the capacity of memory in buffer memory 61 (M0) that is required by the first instruction and also to increment a counter. Then, if the fact that the buffer memory 61 (M0) becomes full is validated on the basis of the information stored in the first buffer memory security-dedicated use packet, one of the buffer memory security signals indicating that the buffer memory 61 (M0) is likely to be full is handed to the system controller 11 (SC#0) of a system board 10 (SB#0) as the ACK (i.e., acknowledge) for receiving the first buffer memory security-dedicated use packet (in step (4)) by way of the crossbar switch 40 (XB#0) (step (5)) under the control of the system controller 31 (SC#0) of the system board 30 (SB#2). Then, the buffer memory security signal is returned to the CPU (CPU#0) of the system board 10 (SB#0), which originally issued the first buffer memory security-dedicated use packet, under the control of the system controller 11 (SC#0) (in step (6)).

Then, the first instruction is issued from the CPU (CPU#0) of the system board 10 (SB#0) (in step (7)) and is handed to system controller 31 (SC#0) of the system board 30 (SB#2) by way of the crossbar switch 40 (XB#0) (in step (9)) under the control of the system controller 11 (SC#0) (step (8)). This prompts the system controller 31 (SC#0) to validate that the first instruction is the instruction corresponding to the first buffer memory security-dedicated use packet and to access memory (DIMM) 81 by way of a MAC 71 (MAC#0) (in step (10)).

Then, the system controller 31 (SC#0) of the system board 30 (SB#2) returns a response corresponding to the first instruction from the memory (DIMM) 81 by way of the MAC 71 (MAC#0) and also decrements the counter (in step (11)); the response corresponding to the first instruction is handed to the system controller 11 (SC#0) of the system board 10 (SB#0) by way of the crossbar switch 40 (XB#0) (in step (13)) under the control of system controller 31 (SC#0) of the system board 30 (SB#2) (in step (12)); and the response corresponding to the first instruction is returned to the CPU (CPU#0) of the system board 10 (SB#0) under the control of the system controller 11 (SC#0) (step (14)).

Meanwhile, after issuing the first buffer memory security-dedicated use packet in the above described step (1), when a second buffer memory security-dedicated use packet corresponding to a second instruction is issued from the CPU (CPU#0) of the system board 10 (SB#0) (in step (15)) and the second buffer memory security-dedicated use packet is handed to the system controller 31 (SC#0) of the system board 30 (SB#2) by way of the crossbar switch 40 (XB#0) (in step (17)) under the control of the system controller 11 (SC#0) (step (16)), it is possible to validate that the capacity of memory in the buffer memory 61 (M0) is going to be full due to receiving the first buffer memory security-dedicated use packet even if the buffer memory 61 (M0) is not yet full.

A preferred embodiment of the present invention has so far been described. The above described embodiment of the present invention can be implemented, as one function of the memory control apparatus, by using hardware, firmware such as a digital signal processing (DSP) board or a CPU board, or using software.

Further, the memory control apparatus to which the present invention is applied may be a single apparatus, a system or integrated apparatus consisting of a plurality of apparatuses, or a system in which the processing is carried out by way of a network such as a local area network (LAN) or a wide area network (WAN), provided that the function of the memory control apparatus is carried out, in lieu of the present invention being limited by the above described embodiment.

The present invention may be implemented by employing a system comprising a CPU, memory such as read only memory (ROM) and random access memory (RAM), an input apparatus, an output apparatus, an external recording apparatus, a media drive apparatus, and a network connection apparatus, all of which are interconnected by a bus. That is, it is obvious that the present invention can also be implemented by providing the memory control apparatus with memory, such as ROM and RAM, an external recording apparatus, and a portable recording medium, all of which store the program code of the software implementing the system according to the above described embodiment, so that the computer of the memory control apparatus reads and executes the program code.

In such a case, the program code read from the portable recording medium and the like is regarded as implementing the new function of the present invention, and the portable recording medium and the like recording the program code are regarded as the constituent of the present invention.

The portable recording medium for supplying the program code can use, for example, a flexible disk, a hard disk, an optical disk, a magneto optical disk, a CD-ROM, a CD-R, a DVD-ROM, a DVD-RAM, a magnetic tape, a nonvolatile memory card, a ROM card, and various recording media recorded by way of a network connection apparatus (i.e., a telecommunications line in other words) such as electronic mail and personal computer (PC) communications.

Further, the function of the above described embodiment is implemented by a computer (i.e., an information processing apparatus) executing the program code read onto the memory and, in addition, the function of the above described embodiment is also implemented by the processing resulting from the operating system (OS) and the like working in the computer carrying out a portion of the actual processing or the entirety thereof on the basis of the instruction of the program code.

Furthermore, a program code read from a portable recording medium and/or a program (and data) provided by a program (and data) provider(s) are (or, is) written to memory comprised by a function extension board inserted into a computer, or by a function extension unit connected to the computer, and then a portion of the actual processing or the entirety thereof is executed by the CPU and the like comprised by the function extension board or a function extension unit on the basis of the instruction of the program code, and thereby the function of the above described embodiment can be implemented.

That is, the present invention may adopt various configurations or forms within the scope thereof, in lieu of being limited to the above described embodiment.

What is claimed is:

1. A memory control apparatus controlling access to memory, comprising:
   buffer memory for temporarily storing data stored in the memory;
   an instruction reception unit for receiving an instruction to the memory;
   a buffer memory security-dedicated use packet transmission unit for transmitting a buffer memory security-dedicated use packet for securing a capacity of memory in the buffer memory that is required by an instruction on the basis of the instruction received by the instruction reception unit;

a buffer memory validation signal reception unit for receiving a buffer memory validation signal corresponding to the buffer memory security-dedicated use packet transmitted by the buffer memory security-dedicated use packet transmission unit; and an instruction execution unit for executing the instruction received by the instruction reception unit on the basis of the buffer memory validation signal received by the buffer memory validation signal reception unit.

2. The memory control apparatus according to claim 1, wherein said instruction is generated by a central processing unit (CPU), and the memory control apparatus is a system controller.

3. The memory control apparatus according to claim 1 is a LSI for use in a system LSI comprising a plurality of the memory control apparatuses.

4. A memory control method which is used for controlling an access to memory and which is carried out in a memory control apparatus comprising buffer memory for temporarily storing data stored in the memory, comprising:

receiving an instruction to the memory;

transmitting a buffer memory security-dedicated use packet for securing, in the buffer memory, a capacity of memory in the buffer memory required by the instruction on the basis of the received instruction;

receiving a buffer memory validation signal corresponding to the transmitted buffer memory security-dedicated use packet; and executing the received instruction on the basis of the received buffer memory validation signal.

* * * * *